United States Patent
Shenoy et al.

(10) Patent No.: US 9,982,881 B2
(45) Date of Patent: May 29, 2018

(54) METHOD AND SYSTEM FOR GAS INITIATED NATURAL CIRCULATION VERTICAL HEAT RECOVERY STEAM GENERATOR

(71) Applicant: GENERAL ELECTRIC TECHNOLOGY GMBH, Baden (CH)

(72) Inventors: Suresh K. Shenoy, Cromwell, CT (US); Rahul Jayant Terdalkar, East Windsor, CT (US); Wesley Paul Bauver, II, Granville, MA (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 274 days.

(21) Appl. No.: 14/693,137

(22) Filed: Apr. 22, 2015

(65) Prior Publication Data
US 2016/0312997 A1    Oct. 27, 2016

(51) Int. Cl.
*F22B 1/18* (2006.01)
*F22B 29/04* (2006.01)
*F22B 35/14* (2006.01)

(52) U.S. Cl.
CPC ............ *F22B 1/1815* (2013.01); *F22B 29/04* (2013.01); *F22B 35/14* (2013.01)

(58) Field of Classification Search
CPC .............................. F22B 1/1815; F22B 35/14
See application file for complete search history.

(56) References Cited

U.S. PATENT DOCUMENTS

| 1,927,095 | A |   | 9/1933  | Lucke    |              |
|-----------|---|---|---------|----------|--------------|
| 2,432,885 | A |   | 12/1947 | Hasche   |              |
| 4,151,813 | A | * | 5/1979  | Gorzegno | F22D 7/04    |
|           |   |   |         |          | 122/407      |
| 4,201,924 | A | * | 5/1980  | Uram     | F01K 23/105  |
|           |   |   |         |          | 290/40 R     |
| 5,575,244 | A | * | 11/1996 | Dethier  | F22B 29/04   |
|           |   |   |         |          | 122/406.1    |

(Continued)

FOREIGN PATENT DOCUMENTS

| CN | 201436467 U | 4/2010 |
|----|-------------|--------|
| DE | 19638851 C1 | 2/1998 |

(Continued)

OTHER PUBLICATIONS

EP0357590A1—machine translation.*
European Search Report and Opinion issued in connection with corresponding EP Application No. 16165616.0 dated Oct. 11, 2016.

*Primary Examiner* — Nathaniel Herzfeld
(74) *Attorney, Agent, or Firm* — GE Global Patent Operation; Stephen G. Midgley

(57) ABSTRACT

The present disclosure is directed to a method and a system employing a gas introduced into the system as a startup operation for a natural circulation vertical heat recovery steam generator (HRSG) to initiate natural circulation of a fluid within the system. More specifically, the present disclosure is directed to a method and a system employing a gas introduced into an outlet header of an evaporator, into an outlet header of an evaporator and into one or more risers near the outlet header of the evaporator, or into one or more risers near the outlet header of the evaporator, to initiate natural circulation of a fluid in a desired system direction from the evaporator directly into a steam drum.

17 Claims, 1 Drawing Sheet

(56) References Cited

U.S. PATENT DOCUMENTS

| | | | | |
|---|---|---|---|---|
| 5,762,031 A | * | 6/1998 | Gurevich | F22B 29/04 |
| | | | | 122/1 C |
| 6,092,490 A | | 7/2000 | Bairley et al. | |
| 6,173,679 B1 | * | 1/2001 | Bruckner | F22B 1/1815 |
| | | | | 122/1 B |
| 6,557,500 B1 | | 5/2003 | Schroeder | |
| 7,243,618 B2 | * | 7/2007 | Gurevich | F22B 1/1815 |
| | | | | 122/406.1 |
| 2010/0170218 A1 | * | 7/2010 | Eluripati | F01K 23/106 |
| | | | | 60/39.183 |

FOREIGN PATENT DOCUMENTS

| | | | |
|---|---|---|---|
| EP | 0 357 590 A1 | 3/1990 | |
| EP | 0357590 A1 * | 3/1990 | F22B 1/1815 |
| GB | 1207688 | 10/1970 | |
| JP | H0384301 | 4/1991 | |
| JP | H07506662 A | 7/1995 | |
| JP | H109502 A | 1/1998 | |

\* cited by examiner

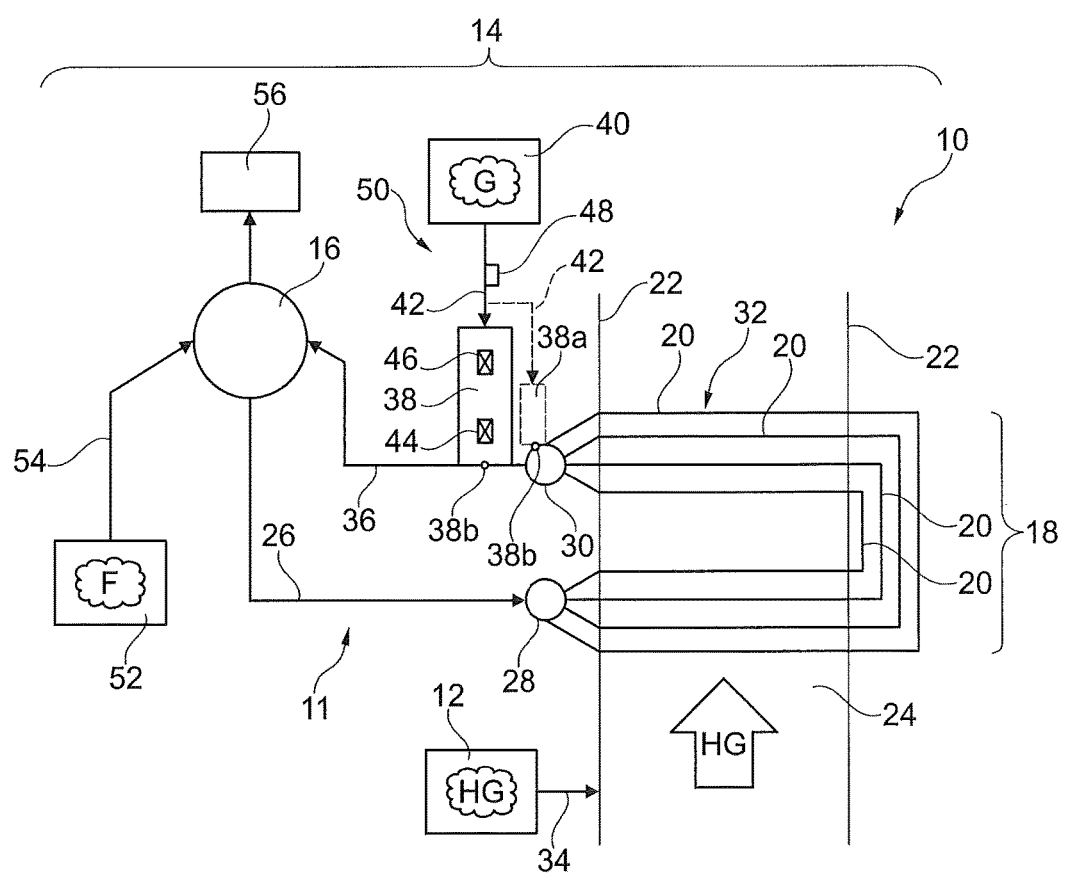

METHOD AND SYSTEM FOR GAS INITIATED NATURAL CIRCULATION VERTICAL HEAT RECOVERY STEAM GENERATOR

FIELD

The present disclosure is directed to a method and a system employing the introduction of a gas into the system as a startup operation to initiate natural circulation in a vertical heat recovery steam generator (HRSG). More specifically, the present disclosure is directed to a method and a system employing the introduction of a gas into an outlet header of an evaporator or into the outlet header of the evaporator and into one or more risers near the outlet header of the evaporator to initiate natural circulation of a fluid therein in a desired flow direction from the evaporator and risers directly to a steam drum of the vertical HRSG.

BACKGROUND

In a natural circulation vertical heat recovery steam generator (HRSG) the evaporator and circulation loops do not have pump circulation. The evaporator and circulation loops rather than having a circulation pump are dependent on natural circulation during operation. Natural circulation is driven by a density difference between the fluid in system downcomer(s) and the fluid in system riser(s) or in system riser(s) and evaporator tubes. During steady state shutdown conditions, i.e., cold, warm and hot shutdown, there is almost no natural circulation, and fluid in the circulation loop is stagnant. After starting a gas turbine associated with the system, the fluid in the evaporator tubes is heated by a hot gas from the gas turbine and eventually starts to boil. In theory, when the fluid in the evaporator tubes begins to boil, natural circulation should be set flowing within the circulation loop in the "correct" direction, i.e., from a steam drum, through the downcomer(s), the evaporation tubes, the riser(s) and back to the steam drum.

The initiation of natural circulation in the correct direction from stagnant fluid conditions is very important for proper operation of the HRSG. In a horizontal HRSG, the evaporator tubes are typically arranged in a vertical orientation. With evaporator tubes in a vertical orientation, natural circulation within the circulation loop is established in the correct direction without difficulty. However, in the subject vertical HRSG, the evaporator tubes are arranged in a horizontal or substantially horizontal orientation. With evaporator tubes in a horizontal or substantially horizontal orientation, the onset of natural circulation within the circulation loop may not immediately establish in the correct direction. Steam produced in the horizontal oriented evaporator tubes may, at least at the onset, flow in an undesirable "reverse" direction, i.e., from a steam drum, through the riser(s), the evaporation tubes, the downcomer(s) and back to the steam drum. Such reverse flow is undesirable as the flow could lead to severe drum level transients during startups, or, in some cases, lead to cessation of fluid circulation in the circulation loop for extended periods of time. This risk is especially possible during a cold startup. Accordingly, a system to initiate natural circulation in the correct direction in horizontally oriented evaporator tubes of a vertical HRSG at startup is needed. Likewise, a method of initiating natural circulation in the correct direction in horizontally oriented evaporator tubes of a vertical HRST at startup is needed.

SUMMARY

The present disclosure is directed to a system and a method employing the introduction of a gas into a circulation loop of a natural circulation vertical heat recovery steam generator (HRSG) as a startup operation to initiate therein natural circulation in the correct direction. As such, the subject system and method employs a gas, such as for example but not limited to air, steam, nitrogen, or any other appropriate substance, for introduction into an outlet header of an evaporator, into the outlet header of the evaporator and into riser(s), or into riser(s) near the outlet header of the evaporator, to induce natural circulation within the circulation loop in the correct direction. According to the subject system, the circulation loop includes a steam drum, fluidly connected to one or more downcomers, fluidly connected to an evaporator inlet, fluidly connected to a plurality of horizontally oriented evaporation tubes, fluidly connected to an evaporator outlet, fluidly connected to one or more riser(s), fluidly connected to the steam drum. Natural circulation of a fluid, preferably water, contained within the circulation loop flows in the correct direction from the steam drum, through the downcomer(s), the evaporation tubes, the riser(s) and back into the steam drum.

The subject system comprises a gas inlet in the outlet header of the evaporator, in the outlet header of the evaporator and in the riser(s) or in the riser(s) near the outlet header of the evaporator. Through the gas injection inlet, a gas such as air, steam, nitrogen, or any other appropriate substance is injected or otherwise introduced so as to bubble up through the stagnant fluid in the riser(s) and collect in the steam drum. The density of the introduced gas is much lower than that of the stagnant fluid within the risers, which will effectively reduce the average density of the fluid within the riser(s). Hence, with the introduction of the gas, the average density of the fluid within the riser(s) becomes lower than the average density of the fluid in the downcomer(s). As a result, natural circulation is immediately commenced in the correct direction within the circulation loop for system startup. The "strength" of the natural circulation may be controlled to some extent by controlling the amount of gas introduced into the system through the gas inlet. After natural circulation is so initiated, an associated gas turbine is ignited. Hot gas generated by the ignited gas turbine flows vertically through a duct and around the outside of the horizontally arranged evaporator tubes thereby effectively heating the fluid within the evaporator tubes. This fluid heating at system startup, produces the first steam bubbles in the fluid within the horizontally oriented evaporator tubes. These first steam bubbles formed in the evaporator tubes will also tend to flow in the correct direction, i.e., into the riser(s) and directly therefrom into the steam drum, following the flow of fluid initiated prior to gas turbine ignition. As steam production increases in the evaporator loop, i.e., evaporator inlet, evaporator tubes and evaporator outlet, natural circulation will be firmly established in the circulation loop based on steam flow alone. When the steam drum pressure increases to a preset value, the flow of gas introduced into the riser(s) may be terminated.

In summary, the subject vertical HRSG system comprises a steam drum, one or more downcomers, an evaporator with a plurality of evaporator tubes arranged horizontally, perpendicular to a flow of hot gas, one or more risers, and a gas flow connector assembly with a gas inlet all fluidly connected. The gas flow connector assembly with the gas inlet is operable for introduction of a gas into a fluid contained within the system to initiate natural circulation flow of the fluid in a "correct" direction, i.e., from the one or more risers directly to the steam drum. The gas introduced into the system via the gas flow connector assembly initiates natural circulation flow of fluid within the system prior to system startup, i.e., prior to ignition of the gas turbine. As such, the gas flow connector assembly introduces a gas into the one or more risers at, near or adjacent to the header outlet of the evaporator, into the header outlet of the evaporator and into the one or more risers at, near or adjacent to the header outlet of the evaporator, or into the header outlet of the evaporator. This introduction of gas into the circulation loop lowers the average fluid density of the fluid within the one or more risers. With the average fluid density of the fluid within the one or more risers becoming lower than the average fluid density of the fluid within the one or more downcomers, natural circulation is initiated within the circulation loop. Further, a flow control valve controls the flow of gas from the gas supply source to the gas flow connector assembly and into the system via the gas inlet. From the gas flow connector assembly, gas is introduced into the circulation loop from a point in time prior to gas turbine ignition until a point in time when fluid pressure in the steam drum increases to a preset value. Such gas introduction into the circulation loop is controlled by a flow control valve. Also important to the system is that the gas flow connector assembly comprises a check valve and an isolation valve, each described in more detail below. Following ignition of the gas turbine, the gas turbine generates a hot gas, which flows through a vertical duct around the outside of the plurality of horizontally arranged evaporator tubes, thereby heating the fluid within the plurality of evaporator tubes. The fluid heated in the plurality of evaporator tubes then circulates by natural circulation in the already initiated correct direction from the risers directly to the steam drum.

The subject method for startup of a vertical HRSG system comprises introducing a gas through a gas inlet of a gas flow connector assembly into one or more risers, a header outlet of an evaporator or both, thus lowering the average fluid density of the fluid therein to initiate natural circulation fluid flow within a circulation loop. The so initiated natural circulation of fluid in the circulation loop circulations in a direction from the one or more risers, to a steam drum, to one or more downcomers, to the evaporator and back to the risers. The gas is introduced through the gas inlet of the gas flow connector assembly as a startup operation to initiate natural circulation fluid flow in a cold, warm or hot startup of the system prior to ignition of an associated gas turbine. The introduced gas is preferably air, steam or nitrogen, and the fluid in the system is preferably water. According to this method, the gas flow connector assembly comprises a check valve to prevent back flow of fluid from the circulation loop into the gas system, with the gas system comprising the gas flow connector assembly, pipe, flow control valve and gas supply source. The gas flow connector assembly also comprises an isolation valve to isolate the gas system from the circulation loop. Further, a flow control valve is arranged and operable to control a flow of gas from the gas system into the circulation loop. Also, according to this method, the evaporator comprises a plurality of evaporator tubes arranged horizontally, perpendicular to a flow of hot gas generated by an associated gas turbine. This hot gas generated by the associated ignited gas turbine flows vertically around the outside of the plurality of horizontally arranged evaporator tubes thereby heating the fluid therein.

Advantages of the subject gas initiated natural circulation vertical HRSG system and method include capital and operational cost reductions over the use of circulation pumps for fluid circulation. Also, natural circulation is preferred over the use of circulation pumps due to increased reliability and reduced maintenance. Additionally, by eliminating the need for circulation pumps, space otherwise occupied by the circulation pumps is available for other necessary system components. A further advantage of the subject system and method, which may also be used in horizontal HRSG systems with vertical evaporator tubes, is that gas introduction into the circulation loop initiates natural circulation fluid flow within the circulation loop prior to ignition of the associated gas turbine. As such, the steam drum is gradually heated and sudden fluid temperature changes and thermal stresses in the steam drum are minimized.

Further features and advantages of the subject system and method will be apparent from the following description and claims.

BRIEF DESCRIPTION OF THE DRAWINGS

FIG. 1 is a schematic side cross sectional view of the subject gas initiated natural circulation vertical heat recovery steam generator system.

DETAILED DESCRIPTION

As illustrated in FIG. 1, the subject system is a gas initiated natural circulation vertical heat recovery steam generator (HRSG) system 10. The subject system 10 comprises a HRSG 14 employing natural fluid circulation arranged downstream of a gas turbine 12. The HRSG 14 comprises a steam drum 16 fluidly connected to one or more downcomer(s) 26. The one or more downcomer(s) 26 are fluidly connected to an inlet header 28 of evaporator 18. Evaporator 18 comprises inlet header 28, a plurality of horizontally arranged evaporator tubes 20, and an outlet header 30, all fluidly connected to form an "evaporator loop" 32 for circulation of a fluid F therethrough. The HRSG 14 also comprises enclosing walls 22, which form a flow duct 24 through which hot gas HG generated by gas turbine 12 flows. As such, hot gas HG from gas turbine 12 flows through fluidly connected duct 34 and into fluidly connected flow duct 24. The plurality of evaporator tubes 20 are arranged parallel to one another and arranged in a horizontal or substantially horizontal orientation across flow duct 24 perpendicular to the flow of hot gas HG through flow duct 24. As illustrated in FIG. 1, each of the plurality of evaporator tubes 20 is formed to pass horizontally across flow duct 24 twice. Optionally however, each of the plurality of evaporator tubes 20 may be formed to pass horizontally across flow duct 24 just once, or any number of times as desired. Fluidly connected to outlet header 30 of evaporator 18 is one or more riser(s) 36. The one or more riser(s) 36 is also fluidly connected to steam drum 16. The subject system 10 does not have a circulation pump. Fluid circulation in system 10 is dependent on natural circulation for operation. Natural circulation of system 10 is based on and operates on the density difference between the fluid density of fluid F in the one or more downcomer(s) 26, and the fluid density of fluid F in the evaporator tubes 20 and the one or more riser(s) 36. During steady state shutdown conditions, i.e., cold, warm, and hot shutdown, there is almost no natural circulation, and the fluid F in system 10 is stagnant. After start of gas turbine 12, fluid F in the evaporator tubes 20 is heated and eventually begins to boil. In theory, boiling of the fluid F in evaporator tubes 20 should begin the natural circulation flow in the "correct" direction. According to the subject system 10, the correct direction of natural circulation fluid flow within circulation loop 11 is in a direction from the steam drum 16, through the one or more downcomer(s) 26, into header inlet 28 of evaporator 18, through evaporator tubes 20, into header outlet 30, through the one or more riser(s) 36, and back to steam drum 16. However, steam produced in the horizontal evaporator tubes 20 may, at least at the onset, flow in a direction opposite to the correct direction of natural circulation fluid flow. Fluid F flow in a direction opposite to the correct direction of natural circulation fluid flow could lead to severe steam drum 16 level transients wherein the liquid in the downcomer(s) 26 is pushed back into the steam drum 16, leading to a rapid rise of steam drum fluid level. In some cases, there may be cessation of fluid F circulation for an extended period of time. This risk is particularly great when initiating a cold startup of system 10.

The subject system 10 and method prevents startup fluid F flow in a direction opposite to the correct direction of natural circulation fluid flow. As such, a gas G, such as but not limited to air, steam, nitrogen, or any other appropriate substance, is introduced into the one or more riser(s) 36, into the one or more riser(s) 36 and outlet header 30, or into outlet header 30, some time before gas turbine 12 is ignited, to initiate natural circulation fluid flow in the correct direction prior to startup. Suitable points of gas G introduction for purposes of the subject system 10, include introduction into the outlet header 30 of evaporator 18, introduction into the one or more riser(s) 36 near or adjacent to the riser(s)' 36 connection to outlet header 30, or introduction into the outlet header 30 of evaporator 18 and into the one or more riser(s) 36 near or adjacent to the riser(s)' 36 connection to outlet header 30. Upon gas G introduction, the gas G will bubble up the riser(s) 36 and into steam drum 16. The density of the gas G introduced into system 10 is much lower than the fluid density, which effectively reduces the average density of the fluid F in the riser(s) 36. With the average density of the fluid F in the riser(s) 36 lower than the average density of the fluid F in the downcomer(s) 26, natural circulation of fluid F is initiated in the correct direction of fluid flow. The "strength" of this natural circulation fluid flow may be controlled to some extent by controlling the amount of gas G introduced into the system 10. Further, upon startup, when the gas turbine 12 is ignited and the first steam bubbles are generated in the heating fluid F of evaporator tubes 20, these bubbles will then also flow into the one or more riser(s) in the correct direction of natural circulation fluid flow already initiated by the introduction of gas G therein.

For purposes of gas G introduction into the subject system 10, a gas flow connector assembly 38 is fluidly connected to one or more riser(s) 36 at, adjacent to, or near its connection to header outlet 30 of evaporator 18, to header outlet 30 of evaporator 18, or to one or more riser(s) 36 at, adjacent to, or near its connection to header outlet 30 of evaporator 18 and to header outlet 30 of evaporator 18. Also, as an alternative, another gas flow connector assembly 38a may be fluidly connected to the header outlet 30 as illustrated in FIG. 1 by dashed lines. Gas flow connector assembly 38, 38a is fluidly connected to a gas G supply source 40 via pipe 42. Each gas flow connector assembly 38, 38a includes a check valve 44 to prevent back flow of fluid F from the circulation loop 11 into the gas system 50, in series with an isolation valve 46 to isolate the gas system 50 from the circulation loop 11. Also, arranged in pipe 42 is a flow control valve 48 to regulate the flow of gas G through gas inlet 38b into the circulation loop 11. Each gas flow connector assembly 38 through which gas G is introduced into riser(s) 36 and/or header outlet 30 of system 10, is rated acceptable for the maximum pressure that the evaporator 18 will experience during the life time of system 10. Gas system 50 comprising gas G supply source 40, pipe 42, pressure flow control valve 48 and gas flow connector assembly 38 with gas inlet 38b, is rated acceptable for the maximum gas supply pressure that the gas system 50 will experience during the life time of system 10.

Fluid F is supplied to circulation loop 11 of system 10 by a fluid supply source 52. Fluid supply source 52 supplies fluid F to the steam drum 16 via fluidly connected piping 54. For purposes of the subject system 10, fluid F is typically and preferably water. Excess fluid F from steam drum 16 may be released to additional system equipment 56, such as for example but not limited to a super heater, not discussed further herein for purposes of clarity.

In summary, the subject vertical HRSG system 10 comprises a steam drum 16, one or more downcomers 26, an evaporator 18 with a plurality of evaporator tubes 20 arranged horizontally, perpendicular to a flow of hot gas HG, one or more risers 36, and a gas system 50 all fluidly connected, such that the gas flow connector assembly 38 is operable for introduction of a gas G into the circulation loop 11 of system 10 to initiate natural circulation flow of a fluid F therein prior to associated gas turbine ignition or startup. The so initiated natural circulation fluid flow within circulation loop 11 is in a direction flowing from the one or more riser(s) 36 directly to the steam drum 16, into the one or more downcomer(s) 26, into the evaporator 18 and back to the one or more riser(s) 36. In the subject system 10 natural circulation flow of fluid F is initiated by the introduction of gas G prior to ignition of an associated gas turbine 12. After ignition of associated gas turbine 12, a flow of hot gas HG generated by gas turbine 12 flows through duct 24 to heat the fluid F within evaporator tubes 20. Heated fluid F within evaporator tubes 20 will follow the already initiated correct direction of fluid F flow within circulation loop 11. Another feature within the subject system 10, the gas flow connector assembly 38, 38a comprises a check valve 44 in series with an isolation valve 46. The gas flow connector assembly 38, 38a introduces gas G via a gas inlet 38b into the one or more riser(s) 36 at, near or adjacent to the header outlet 30 of the evaporator 18, into the header outlet 30 of the evaporator 18, or into the one or more riser(s) 36 at, near or adjacent to the header outlet 30 of the evaporator 18 and into the header outlet 30 of the evaporator 18. As an alternative, another gas flow connector assembly 38a illustrated in FIG. 1 by dotted lines, may introduce gas G into the header outlet 30 of the evaporator 18. This introduction of gas G into the system 10 lowers the average fluid density of fluid F in the one or more riser(s) 36 thereby initiating natural circulation in the correct direction from the one or more riser(s) 36 directly into the steam drum 16. Further, a pressure flow control valve 48 controls flow of gas G to the gas flow connector assembly 38 and system 10. As such, the gas G is introduced into the system 10, controlled by the flow control valve 48, beginning prior to gas turbine 12 ignition or startup and ending when fluid F pressure in the steam drum 16 increases to a preset value.

The subject method for startup of a vertical HRSG system 10 comprises introducing via a gas flow connector assembly 38 with a gas inlet 38b a gas G into one or more riser(s) 36, a header outlet 30 of an evaporator 18 or both 36, 30 so as to lower the average fluid density of a fluid F therein to initiate natural circulation fluid flow in a circulation direction of flow from the one or more riser(s) 36, to a steam drum 16, to one or more downcomer(s) 26, to an evaporator 18 and back to the one or more riser(s) 36. Gas G is introduced to circulation loop 11 of the system 10 prior to ignition of an associated gas turbine 12, so as to initiate natural circulation fluid flow in a cold, warm or hot startup of the system 10. The introduced gas G is preferably air, steam or nitrogen, and the fluid F in the system is preferably water. According to this method, the evaporator 18 comprises a plurality of evaporator tubes 20 arranged horizontally, essentially perpendicular to a flow of hot gas HG generated by an associated ignited gas turbine 12. Also according to this method, the gas flow connector assembly 38 comprises a check valve 44 to prevent the back flow of fluid F from the circulation loop 11 into the gas system 50, in series with an isolation valve 46 to isolate the gas system 50 from the circulation loop 11. Further, the flow control valve 48 controls the flow of gas G introduced into the circulation loop 11 of system 10.

Advantages of the subject gas initiated natural circulation vertical HRSG system 10 and method include capital and operational cost reductions over the use of circulation pumps for fluid F circulation therein. Also, natural circulation is preferred over the use of circulation pumps due to the increased reliability and reduced maintenance demands of natural circulation. Additionally, by eliminating the need for circulation pumps, space otherwise occupied by fluid circulation pumps becomes available for other necessary system components.

The system and method described herein is intended to be used only in an illustrative manner, as one example of a gas initiated natural circulation vertical HRSG system made in accordance with the subject disclosure. In this regard, it is evident that those skilled in the art, once given the benefit of this disclosure, may make modifications to the specific embodiments described herein without departing from the spirit and scope of thereof as defined by the following claims.

The invention claimed is:

1. A vertical heat recovery steam generator system comprising:
    a gas turbine arranged to initiate a flow of hot gas upon start up;
    a steam drum;
    one or more downcomers;
    an evaporator with a plurality of evaporator tubes arranged perpendicular to the flow of hot gas;
    one or more risers; and
    a gas flow connector assembly fluidly connected to the one or more risers, for gas flow connector assembly introduction of a gas other than steam into the system prior to the start up of the gas turbine to reduce an average density of a fluid therein to thereby initiate natural circulation flow of the fluid therein in a direction from the one or more risers directly to the steam drum.

2. The system of claim 1, wherein the gas flow connector assembly comprises a check valve and an isolation valve.

3. The system of claim 1, wherein a pressure flow control valve controls flow of the gas to the gas flow connector assembly and into the system.

4. The system of claim 1, wherein the gas flow connector assembly introduces the gas into the one or more risers at, near or adjacent to a header outlet of the evaporator.

5. The system of claim 4, wherein the gas flow connector assembly introduces gas into the header outlet of the evaporator.

6. The system of claim 1, wherein the introduction of gas into the system lowers the average fluid density of fluid in the one or more risers.

7. The system of claim 1, wherein the introduction of gas into the system is ended when a fluid pressure in the steam drum increases to a preset value, with introduction of the gas being controlled by a pressure flow control valve.

8. The system of claim 1, further comprising:
    a secondary gas flow connector assembly configured for introduction of a secondary gas into the system to reduce the average density of the fluid in the system to initiate natural circulation flow of the fluid therein, for flow circulation in the direction from the one or more risers directly to the steam drum;
    wherein the secondary gas flow connector assembly is configured to introduce the secondary gas at a secondary location that is different than a location at which the gas flow connector assembly introduces the gas other than steam.

9. A method for startup of a vertical heat recovery steam generator system comprising:
    introducing, prior to start up of an associated gas turbine, via a gas flow connector assembly, a gas other than steam into one or more risers, a header outlet of an evaporator, or both to lower the average fluid density of a fluid therein to initiate natural circulation fluid flow in a flow direction from the one or more risers, to a steam drum, to one or more downcomers, to the evaporator and back to the one or more risers.

10. The method of claim 9, wherein the gas is introduced to initiate natural circulation fluid flow in a cold, warm or hot startup of the system.

11. The method of claim 9, wherein the gas is air or nitrogen.

12. The method of claim 9, wherein the fluid is water.

13. The method of claim 9, wherein the evaporator comprises a plurality of evaporator tubes arranged horizontally, perpendicular to a flow of hot gas.

14. The method of claim 9, wherein the gas flow connector assembly comprises a check valve to prevent back flow of fluid from a circulation loop into a gas system, and an isolation valve to isolate the gas system from the circulation loop.

15. The method of claim 9, further comprising the step of:
    introducing via a secondary gas flow connector assembly a secondary gas, at a secondary location different than a location at which the gas flow connector assembly introduces the gas, into one or more risers, a header outlet of an evaporator or both so as to lower the average fluid density of the fluid therein to initiate natural circulation fluid flow in the flow direction from the one or more risers, to a steam drum, to one or more downcomers, to the evaporator and back to the one or more risers.

16. A vertical heat recovery steam generator system comprising:
    a steam drum;
    one or more downcomers;
    an evaporator with a plurality of evaporator tubes arranged perpendicular to a flow of hot gas;
    one or more risers having an inlet end and an outlet end, the outlet end fluidly coupled to the steam drum;
    a header having a header inlet fluidly coupled to the outlet end of the plurality of evaporator tubes, and a header outlet fluidly coupled to the inlet end of the one or more risers;
    a gas flow connector assembly configured to introduce a gas into the system at the one or more risers to reduce an average density of a fluid therein to initiate natural circulation flow of a fluid therein, for flow circulation in a direction from the one or more risers directly to the steam drum; and a secondary gas flow connector assembly configured to introduce a secondary gas into the system at the header outlet to reduce the average density of the fluid in the system to initiate natural circulation flow of the fluid therein, for flow circulation in the direction from the one or more risers directly to the steam drum.

17. The vertical heat recovery steam generator system of claim 16, wherein both the gas flow connector assembly and the secondary gas flow connector assembly are configured to introduce the gas and the secondary gas, respectively, prior to start up of an associated gas turbine.

* * * * *